Aug. 23, 1932. P. FRANCKE 1,873,836
BABY CARRIAGE SLED
Filed March 20, 1931 2 Sheets-Sheet 1
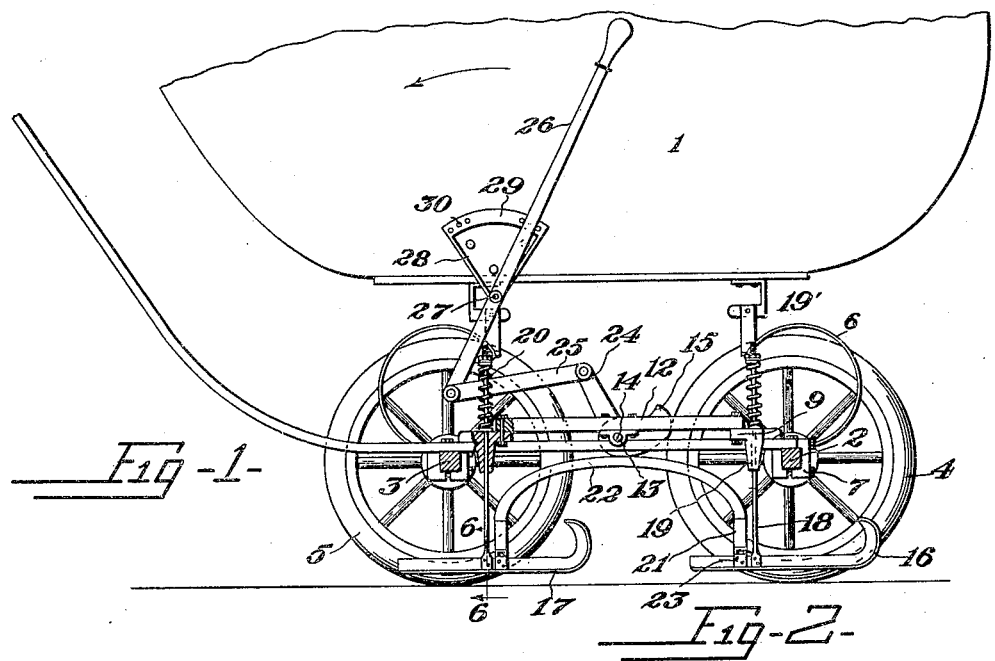
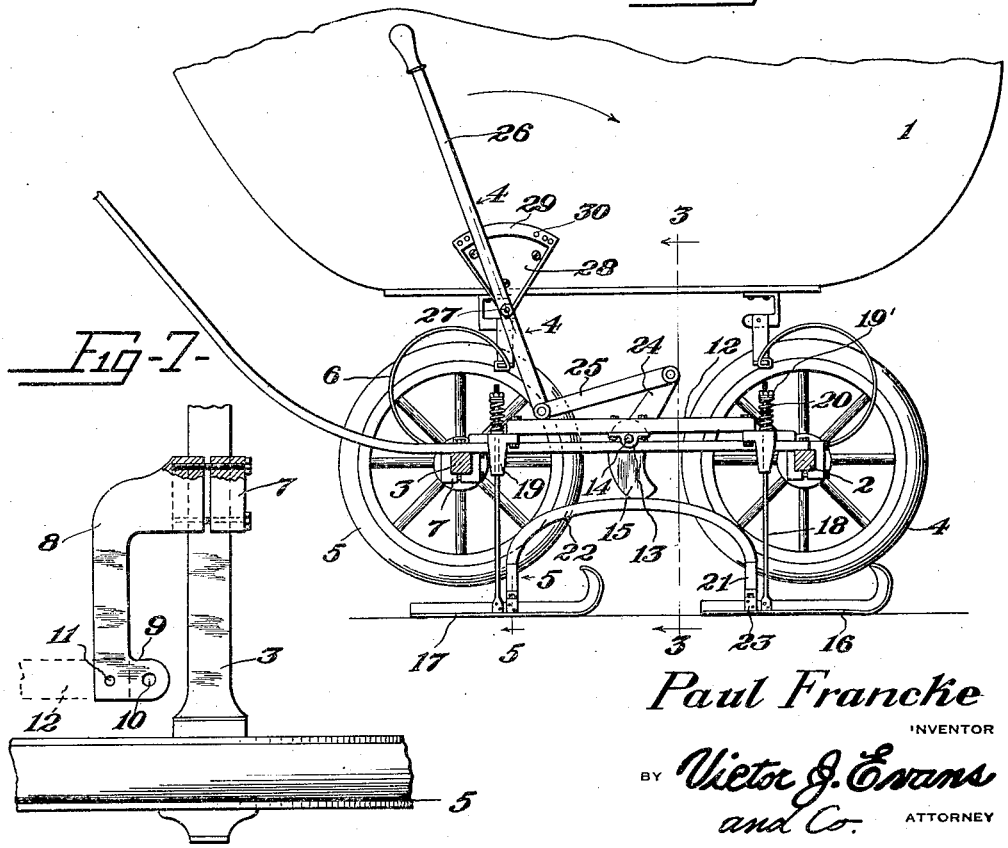
Paul Francke
INVENTOR
BY Victor J. Evans
and Co. ATTORNEY Aug. 23, 1932.  P. FRANCKE  1,873,836
BABY CARRIAGE SLED
Filed March 20, 1931   2 Sheets-Sheet 2
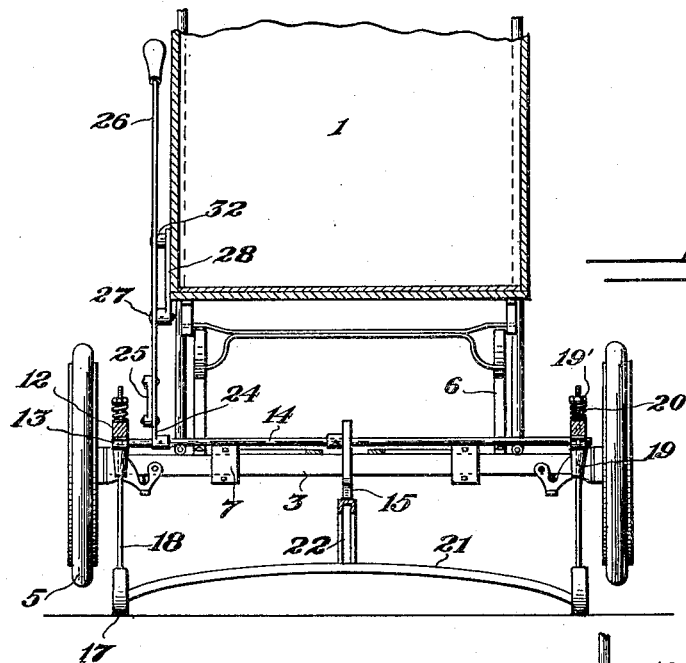
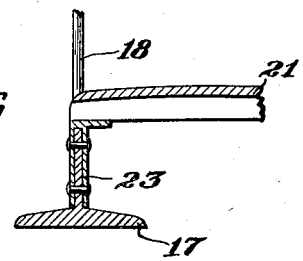
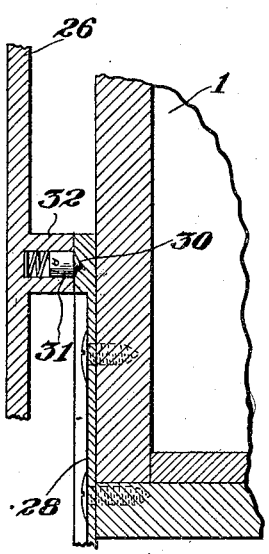
Paul Francke
INVENTOR
BY Victor J. Evans and Co. ATTORNEY Patented Aug. 23, 1932

1,873,836

UNITED STATES PATENT OFFICE

PAUL FRANCKE, OF NEW BRUNSWICK, NEW JERSEY

BABY CARRIAGE SLED

Application filed March 20, 1931. Serial No. 524,134.

My present invention has reference to a means for converting a baby carriage or like wheeled vehicle into a runner vehicle, so that the carriage may employ either runners or wheels as a support and also whereby the carriage may be employed with equal efficiency when propelled over dry or icy surfaces.

A further object is the provision of a means for converting a baby carriage into a sled or runner propelled vehicle, in which the runners and the parts associated therewith may be removably connected with the running gear and with the body of an ordinary baby carriage and as readily removed therefrom when not desired for use.

A still further object is the provision of a means for converting a baby carriage into a sled that embodies features of construction which are simple in nature, easily and cheaply manufactured, readily applied to or detached from the running gear of a baby carriage and which will be found reliable and efficient in practical use.

To the attainment of the foregoing the invention consists in the improvement hereinafter described and definitely claimed.

In the drawings:

Figure 1 is a side elevation of the improvement in applied position, parts being in section.

Figure 2 is a similar view but showing mechanism operated to lower the runners and raise the wheels of the vehicle and thus convert the carriage into a runner vehicle.

Figure 3 is a sectional view approximately on the line 3—3 of Figure 2.

Figure 4 is a detail sectional view approximately on the line 4—4 of Figure 2.

Figure 5 is a detail transverse sectional view approximately on the line 5—5 of Figure 2.

Figure 6 is a detail sectional view approximately on the line 6—6 of Figure 1.

Figure 7 is a plan view to illustrate the manner in which one of the arms is clamped to the axle of the baby carriage.

In the drawings the body of a baby carriage is indicated by the numeral 1. The running gear for the baby carriage includes the usual spring hung front and rear axles 2 and 3 on whose ends there are journaled the wheels 4 and 5. In the showing of the drawings the running gear supporting springs 6 are connected to hangers supported by brackets on the under face of the body.

Secured by a clamp 7 to each of the axles 2 and 3 directly inward of the respective wheels 4 and 5 there are the concaved faces of the inner and angle ends of castings in the nature of arms 8. The securing means between the castings 8 and the removable clamps are preferably in the nature of bolts, as disclosed by Figure 7 of the drawings, and the outer ends of the arms 8 are disposed a slight but suitable distance inward of the respective wheels 4 and 5. These ends of the arms are offset or provided each with a lateral extension 9, and the said extensions as well as the end of the arm proper have round openings 10 and 11 therethrough. There are arranged over the inner and outer alining pairs of arms bars 12, respectively, and passing through the ends of these bars and through the openings 11 there are passed securing means. On the under face at the center of each of the bars there is a bearing 13 for a transversely arranged shaft 14, the said shaft having centrally fixed thereon a cam lug 15 and the purpose of this arrangement will be presently described.

The front and rear pairs of runners are indicated in the drawings by the numerals 16 and 17, respectively. The runners are preferably in the nature of angle plates and have their forward ends provided with upwardly rounded nose portions. The outwardly extending flanges of the runners 16 and 17 have rigidly secured thereto upstanding rods 18, the said rods passing through openings in bosses 19 that depend from and surround the openings 10 in the extensions 9 of the arms 8. The upper ends of the arms 18 are threaded and have screwed thereon nuts 19' which contact with washers and which washers in turn contact with coil expansion springs 20 that surround the respective rods 18 and bear against the lateral extensions 9 of the arms 8.

The respective oppositely disposed pairs of front and rear runners are connected together in spaced relation by means 23 on the ends of upwardly rounded bars 21, respectively, and these rounded or arched bars are centrally connected together by the straight ends of a longitudinally extending arched rail 22. For the sake of strength the rail or rounded connecting members for the runners are channeled. The arched rail 22 affords a bearing or contact surface for the cam 15.

From its pivotal connection with the shaft 14 the cam 15 is provided with an arm extension 24 to which is pivotally secured a link 25, and this link is pivotally secured to the lower end of a lever 26. The pivot 27 for the lever enters the lower and reduced portion of a substantially V-shaped plate 28 whose upper edge 29 is arched and thickened on its upper face. This thickened portion 29 is provided, adjacent its ends with spaced series of depressions 30. Any one of the depressions is designed to be engaged by a spring influenced detent 31 that is movable through a socket 32 on the inner face of the lever 26, when the lever is swung on its pivot 27.

By swinging the lever to the position disclosed by Figure 1 of the drawings the cam 15, riding on the arched rail, will be caused to move upwardly which permits the springs 20 to raise the rods 18 and consequently raise the runners 16 and 17 above the ground contacting surfaces of the treads of the wheels 4 and 5, it being understood that the runners 16 and 17 are disposed inwardly between the pair of wheels 4 and 5. The detent carried by the lever 26 engages in one of the depressions at the right hand side of the segmental member 28, as disclosed by the said Figure 1 of the drawings. This holds the lever from free movement and the springs 20 cause the cam 21 to still rest against the arched rail 22 so that the rattling or free movement of the parts when the runners are elevated is thus effectively prevented. The swinging of the lever to the position disclosed by Figure 2 will lower the runners and the engagement of the detent with the walls of one of the depressions in the left hand side of the segment 28 in Figures 1 and 2 will hold the runners in lowered or active position so that the same cannot be accidentally raised when employed for propelling the vehicle over snow or icy surfaces.

The parts constituting the improvement are readily detachable from the baby carriage and may it will be noted be easily applied thereto. As a matter-of-fact, the runners may remain a permanent part of the baby carriage as when the runners are in elevated position the carriage can be wheeled in the usual manner and it is that that the foregoing description will clearly and fully set forth the advantages of the construction without further detailed description.

Having described the invention, I claim:

A runner attachment for a baby carriage, comprising arms removably clamped to the front and rear axles of the baby carriage, and directed toward and terminating adjacent the inner sides of the wheels of the baby carriage and having their outer ends provided with depending bosses, front and rear pairs of runners arranged inward of the wheels of the carriage, a rod having its lower end fixedly secured to each of the runners and its upper end passing through the bosses in the angle ends of the arms, spring means engaging the upper ends of the rods to hold the same in the bosses and to raise the runners above the ground, upwardly rounded members having straight ends connecting the respective pairs of runners, an upwardly arched rail also having straight ends which are centrally fixed to the rounded runner connecting members, bars fixedly secured to the upper faces and adjacent pairs of arms, a shaft journaled transversely on the bars, a cam member pivoted to the shaft and arranged for contact with the rails when the runners are either in their raised or lowered position, a pivotally supported lever, means between the lever and cam for swinging the cam on the track to lower the runners or for permitting the runners being raised by the spring influenced bars and means for latching the lever for holding the cam and rails in either of such positions.

In testimony whereof I affix my signature.

PAUL FRANCKE.